United States Patent
Belleschi et al.

(10) Patent No.: US 10,575,224 B2
(45) Date of Patent: Feb. 25, 2020

(54) METHOD AND APPARATUS FOR CELLULAR HANDOVERS INVOLVING SIDELINK COMMUNICATIONS

(71) Applicant: Telefonaktiebolaget LM Ericsson (publ), Stockholm (SE)

(72) Inventors: Marco Belleschi, Solna (SE); Gino Masini, Stockholm (SE); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 45 days.

(21) Appl. No.: 15/512,424

(22) PCT Filed: Feb. 2, 2017

(86) PCT No.: PCT/SE2017/050089
§ 371 (c)(1),
(2) Date: Mar. 17, 2017

(87) PCT Pub. No.: WO2017/135877
PCT Pub. Date: Aug. 10, 2017

(65) Prior Publication Data
US 2018/0115930 A1      Apr. 26, 2018

Related U.S. Application Data

(60) Provisional application No. 62/291,228, filed on Feb. 4, 2016.

(51) Int. Cl.
*H04W 36/00* (2009.01)
*H04W 56/00* (2009.01)

(52) U.S. Cl.
CPC ..... *H04W 36/0072* (2013.01); *H04W 56/001* (2013.01)

(58) Field of Classification Search
CPC .......... H04W 36/0072; H04W 56/001; H04W 36/03
See application file for complete search history.

(56) References Cited

U.S. PATENT DOCUMENTS

2015/0163705 A1* 6/2015 Lu .................... H04W 36/0055
370/331
2015/0264588 A1 9/2015 Li et al.
(Continued)

FOREIGN PATENT DOCUMENTS

WO        2015137637 A1    9/2015

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0 (Dec. 2015), Dec. 2015, 1-507.
(Continued)

*Primary Examiner* — Peter P Chau
(74) *Attorney, Agent, or Firm* — Murphy, Bilak & Homiller, PLLC

(57) ABSTRACT

In one aspect of the teachings herein, a radio network node (20) associated with a source cell (22-1) provides sidelink configuration information to a wireless device (16) to be handed over to a target cell (22-2). The information indicates the sidelink synchronization and resource configurations associated with the target cell, and the wireless device performs sidelink communications based on the sidelink synchronization and resource configurations of the target cell. Receiving the sidelink resource and timing information associated with the target cell enables the wireless device to perform sidelink communications using the target-cell resources and timing, even while still being served in a cellular sense from the source cell. Thus, the wireless device may begin or resume sidelink communications using the
(Continued)

sidelink timing and resources associated with the target cell, irrespective of whether cellular handover of the wireless device from the source cell to the target cell has completed.

9 Claims, 4 Drawing Sheets

(56) References Cited

U.S. PATENT DOCUMENTS

| | | | |
|---|---|---|---|
| 2015/0271861 A1 | 9/2015 | Li et al. | |
| 2016/0286507 A1* | 9/2016 | Yang | H04W 8/005 |
| 2016/0302119 A1* | 10/2016 | Chen | H04W 56/002 |
| 2017/0215119 A1* | 7/2017 | Hong | H04W 36/08 |
| 2017/0273042 A1* | 9/2017 | Shilov | H04W 56/002 |
| 2017/0367059 A1* | 12/2017 | Park | H04W 36/30 |

OTHER PUBLICATIONS

3GPP, "3rd Generation Partnership Project; Technical Specification Group Radio Access Network; Evolved Universal Terrestrial Radio Access Network (E-UTRAN); X2 application protocol (X2AP) (Release 13)", 3GPP TS 36.423 V13.2.0 (Dec. 2015), Dec. 2015, 1-230.

Unknown, Author, "Dual Connectivity and SIPTO@LN with Co-Located L-GW", 3GPP TSG-RAN WG3 #87bis R3-150744, Tenerife—Santa Cruz, Spain, Apr. 20-24, 2015, 1-6.

Unknown, Author, "Mobility for D2D UEs", 3GPP TSG-RAN WG3 #82 R3-132277, San Francisco, USA, Nov. 11-15, 2013, 1-6.

Aydin, Osman et al., "Final Report on Network-Level Solutions", Mar. 1, 2015, pp. 1-148.

Ho-Yuan, Chen et al., "Handover Mechanism for Device-to-Device Communication", 2015 IEEE Conference on Standards for Communications and Networking (CSCN), IEEE, Oct. 28, 2015, pp. 72-77.

Unknown, Author, "Discussion on the ProSe authorised indication in X2 handover", 3GPP TSG-RAN WG3 #85, R3-141809, ZTE, Dresden, Germany, Aug. 18-22, 2014, pp. 1-4.

Unknown, Author, "Sidelink Resource Allocation in V2X", 3GPP TSG-RAN WG2 #93-bis, Tdoc R2-162818, Dubrovnik, Croatia, Apr. 11-15, 2016, pp. 1-6.

Unknown, Author, "Discussion on the Coordination of D2D Resource for Inter-Cell D2D Discover and Communication", 3GPP TSG-RAN WG3 Meeting #83, R3-140047, ZTE, Prague, Czech, Feb. 10-14, 2014, 6 pages.

Unknown, Author, "Remaining Issues on Resource Allocation and Mobility Related Issues for D2D Communication", 3GPP TSG-RAN WG2 Meeting #87bis, R2-144288, Fujitsu, Shanghai, China, Oct. 6-10, 2014, 5 pages.

* cited by examiner

METHOD AND APPARATUS FOR CELLULAR HANDOVERS INVOLVING SIDELINK COMMUNICATIONS

TECHNICAL FIELD

The present invention relates to cellular handovers in a wireless communication network, such as from a source cell to a target cell, and particularly relates to cellular handovers involving sidelink communications.

BACKGROUND

The term "sidelink" refers to a direct radio link for communication among devices in Third Generation Partnership Project (3GPP) radio access networks, as opposed to communication via the cellular infrastructure (uplink and downlink). The sidelink is also referred to as a Device-to-Device (or D2D) link. The term "V2x" denotes "Vehicle-to-Everything" communications, and it encompasses communications involving vehicles as message sources or destinations. V2x communications may involve respective vehicles as endpoints or may involve vehicles communicating with infrastructure nodes or other types of devices. The "PC5" interface is used to carry V2x communications between user equipments (UEs), which may be embedded in vehicles or other node, device, or system types engaged in Proximity Services (ProSe) D2D communications. The interested reader may refer to R3-150744—ProSe Resource Coordination Across eNBs, Ericsson, R3-132277—Mobility for D2D UEs, Ericsson, and 3GPP TS 36.423 Rel-13, for additional context.

Release 12 of the 3GPP specifications extend the LTE standard with D2D or sidelink communication features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between wireless devices. Here, the term "device" means a UE or essentially any apparatus configured for sidelink communications.

One of the potential extensions for the D2D work consists of support of V2x communication, which includes any combination of direct communication between vehicles, pedestrians and infrastructure. V2x communication may take advantage of a network (NW) infrastructure, when available, but at least basic V2x connectivity should be possible even in case of lack of coverage. Providing an LTE-based V2x interface may be economically advantageous because of the LTE economies of scale and it may enable tighter integration between communications with the NW infrastructure (V2I) and V2P and V2V communications, as compared to using a dedicated V2x technology. The nearby figure illustrates example V2x scenarios for an LTE-based wireless communication network.

V2x communications may carry both non-safety and safety information, where each of the applications and services may be associated with specific requirements sets, e.g., in terms of latency, reliability, capacity, etc. ETSI has defined two types of messages for road safety: Cooperative Awareness Message (CAM) and Decentralized Environmental Notification Message (DENM).

CAM messages are intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is indicatively checked for every 100 ms, yielding a maximum detection latency requirement of <=100 ms for most messages. However, the latency requirement for Pre-crash sensing warning is 50 ms.

DENM messages are event-triggered, such as by braking, and the availability of a DENM message is also checked for every 100 ms, and the requirement of maximum latency is <=100 ms.

The package size of CAM and DENM message varies from 100 plus to 800 plus bytes and the typical size is around 300 bytes. The message is supposed to be detected by all vehicles in proximity.

The SAE (Society of the Automotive Engineers) also defined the Basic Safety Message (BSM) for DSRC with various messages sizes defined. According to the importance and urgency of the messages, the BSMs are further classified into different priorities.

UE mobility—i.e., cellular mobility within a cellular network—can be supported for UEs that are using PC5 resources. When such a UE is handed over, the PC5 resources with which it has been configured by its serving cell can be included by the source eNB in its "RRC context" (defined as RRC Context IE by 3GPP TS 36.423 and TS 36.331), signaled to the target eNB in the X2 HANDOVER REQUEST message. If the target cell is able to allocate the same set of radio resources to the UE, this prevents the UE from losing the PC5 connection. However, it is recognized herein that the UE still may experience unacceptably long interruptions in its sidelink communications during cellular handovers.

In typical D2D scenarios, PC5 synchronization in conjunction with cellular mobility may not be an issue due to the less stringent mobility requirements with respect to e.g. V2x, where high UE mobility is typical. As previously mentioned sidelink transmissions (also known as D2D or ProSe) in cellular spectrum that have been standardized in 3GPP since Rel-12 can be tailored for V2X-type services. In 3GPP Rel-12 two different operative modes have been specified in 3GPP. In one mode, a UE in RRC_CONNECTED mode requests D2D resources and the eNB grants them via PDCCH (DCIS) or via dedicated signaling. In another mode, a UE autonomously selects resources for transmission from a pool of available resources that the eNB provides in broadcast via System Information Block (SIB) signaling for transmissions on carriers other than the PCell or via dedicated signaling for transmission on the PCell. Therefore, unlike the first operation mode, the second operation mode can be performed also by UEs in RRC_IDLE.

A key issue recognized in this disclosure is that V2x traffic is characterized by messages with certain latency constraints. During a cellular handover of a UE there is typically some increase in latency due to the fact that a UE needs to read system information for the cellular network and perform a resynchronization and RRC reconfiguration to the target cell before being able to resume communication operations. Such operations may be regarded as performing a cellular handover process. The latency associated with the cellular handover process may violate some V2x traffic latency constraints.

SUMMARY

In one aspect of the teachings herein, a radio network node associated with a source cell provides sidelink configuration information to a wireless device to be handed over to a target cell. The information indicates the sidelink synchronization and resource configurations associated with a target cell, and the wireless device performs sidelink communications based on the sidelink synchronization and resource configurations of the target cell. Receiving the sidelink resource and timing information associated with the target cell allows the wireless device to perform sidelink communications using the target-cell resources and timing, even while still being served in a cellular sense from the source cell. Thus, the wireless device may begin or resume sidelink communications using the sidelink timing and resources associated with the target cell, irrespective of whether cellular handover of the wireless device from the source cell to the target cell has completed.

In an example embodiment, a method of operation in a wireless device configured for operation in a wireless communication network includes the device receiving sidelink configuration information for a second cell. The received information indicates sidelink resources and sidelink timing associated with the second cell, and the method further includes the device receiving handover signaling indicating a cellular handover of the wireless device from a first cell to the second cell. In response to receiving the handover signaling, the device performs a cellular handover process with respect to the second cell, including acquiring cellular synchronization with respect to the second cell, and performs a sidelink synchronization process with respect to the second cell. The sidelink synchronization process includes acquiring sidelink timing synchronization with respect to the second cell, and the method further includes the wireless device resuming or initiating sidelink communications using the sidelink resources and the sidelink timing associated with the second cell, once sidelink synchronization is acquired with respect to the second cell via the sidelink synchronization process and irrespective of whether the cellular handover process has been completed.

In a related example embodiment, a wireless device configured for operation in a wireless communication network includes communication circuitry and processing circuitry. The communication circuitry is configured for communicating with radio network nodes in the wireless communication network via cellular connections and for communicating with other wireless devices or nodes via sidelink connections.

The processing circuitry is operatively associated with the communication circuitry and configured to receive sidelink configuration information for a second cell of the wireless communication network, indicating sidelink resources and sidelink timing associated with the second cell, and to receive handover signaling indicating a cellular handover of the wireless device from a first cell of the wireless communication network to the second cell. Further, the processing circuitry is configured to perform a cellular handover process and a sidelink synchronization process, in response to receiving the handover signaling.

The cellular handover process is performed with respect to the second cell and includes acquiring cellular synchronization with respect to the second cell. The sidelink synchronization process is performed with respect to the second cell and includes acquiring sidelink timing synchronization with respect to the second cell. Further, the processing circuitry is configured to resume or initiate sidelink communications using the sidelink resources and the sidelink timing associated with the second cell, once sidelink synchronization is acquired with respect to the second cell via the sidelink synchronization process and irrespective of whether the cellular handover process has been completed. That is, the sidelink synchronization process may be completed before the cellular synchronization process completes, and acquiring sidelink synchronization via the sidelink synchronization process allows the wireless device to resume or initiate sidelink communications using resources and timing associated with the second cell before completion of the cellular handover process.

In another example embodiment, a method of operation at a radio network node configured for operation in a wireless communication network includes obtaining sidelink configuration information for a second cell that neighbors a first cell provided by the radio network node. The sidelink configuration information indicates a sidelink resource configuration for the second cell, and a sidelink synchronization configuration for the second cell, and the method further includes transmitting the sidelink configuration information to a wireless device having a cellular connection to the first cell, in advance of, or in conjunction with, a cellular handover of the wireless device from the first cell to the second cell. Providing the sidelink configuration information to the wireless device enables the wireless device to acquire sidelink timing synchronization with respect to the second cell.

In a related embodiment, a radio network node is configured for operation in a wireless communication network and includes communication circuitry and processing circuitry. The communication circuitry comprises receiver and transmitter circuitry configured at least for communicating with wireless devices, and the processing circuitry is operatively associated with the communication interface circuitry and configured to perform a number of operations. In a particular example, the processing circuitry is configured to obtain sidelink configuration information for a second cell that neighbors a first cell provided by the radio network node, where the sidelink configuration information indicates a sidelink resource configuration for the second cell, and a sidelink synchronization configuration for the second cell. The processing circuitry is further configured to transmit the sidelink configuration information to a wireless device having a cellular connection to the first cell, in advance of, or in conjunction with, a cellular handover of the wireless device from the first cell to the second cell. The sidelink configuration information enables the wireless device to acquire sidelink timing synchronization with respect to the second cell.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
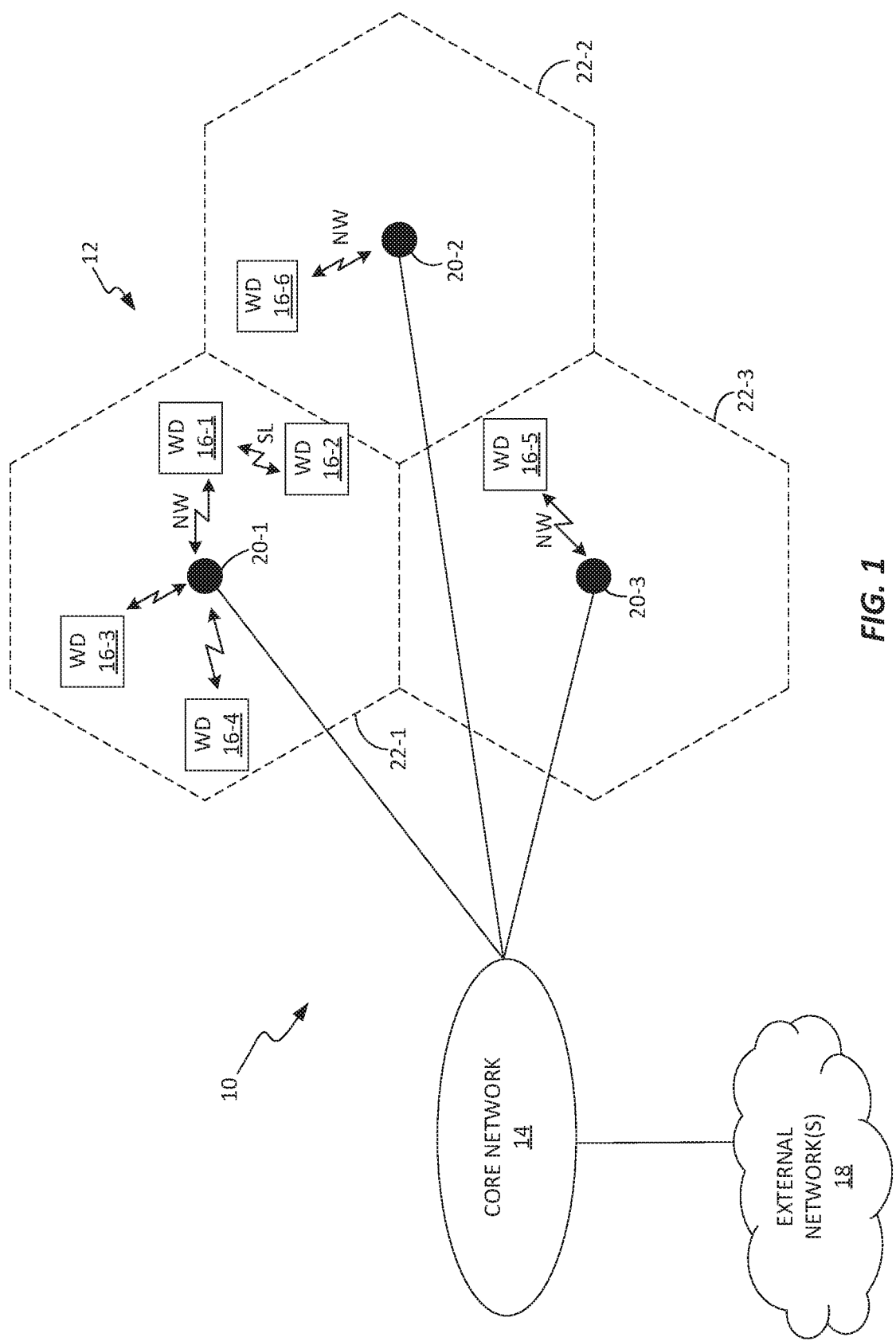
FIG. 1 is a block diagram of one embodiment of a wireless communication network.

By way of non-limiting example, FIG. 1 illustrates one embodiment of a wireless communication network, such as a wide-area cellular radio network based on the Long Term Evolution (LTE) standard or based on another Third Generation Partnership Project (3GPP) standard.

The network 10 includes a Radio Access Network or RAN 12, along with a Core Network or CN 14. The network 10 communicatively couples essentially any number of wireless devices 16 (WDs in the diagram) to each other, or to any number of other systems or devices reachable through one or more external networks 18. Only six WDs 16 (16-1 through 16-6) are shown by way of example, but it shall be understood that potentially many more WDs 16 may be operating in the network 10. It shall also be understood that the WDs 16 are not necessarily all of the same type or function. Example WDs 16 include any one or more of smartphones, feature phones, wireless computers, communication network adaptors, dongles, Machine-Type Communication (MTC) devices, also referred to as M2M devices, etc. Using 3GPP parlance, the WDs 16 may be referred to as UEs or "user equipments".

The RAN 10 includes a number of base stations 20, such as eNBs in the LTE context. The base stations are a type of radio network node and are more generally referred to as radio network nodes 20. In the diagram, each radio network node 20 provides a cell 22, e.g., the network node 20-1 provides the cell 22-1, and so on. As an example, a cell 22 may be regarded as comprising specific communication resources—e.g., specific frequencies and/or times—used for providing network coverage over a corresponding geographic area. Of course, there may be overlapping cells 22, and a given network node 20 may provide more than one cell 22.

The resources—e.g., radio resources—allocated for sidelink communications may be associated with the cellular radio resources on the Uplink (UL). To carry out sidelink communications using such resources, a given WD 16 must know the corresponding sidelink resource configuration and sidelink synchronization configuration. For example, the WD 16-6 may perform sidelink communications using sidelink timing and resource configurations associated with the cell 22-2, while the WD 16-1 performs sidelink communications using the sidelink timing and resource configurations associated with the cell 22-1. It should be understood that such sidelink communications may involve other WDs 16 depicted in the figure, or may involve other nodes or devices, etc., not explicitly shown.

Consider a non-limiting example scenario where the WD 16-1 has a cellular connection to the base station 20-1/cell 22-1, and is carrying out sidelink communications using sidelink timing and resource configurations associated with the cell 22-1. According to an example embodiment herein, in advance of, or in conjunction with, handover of the WD 16-1 to the cell 22-2, the base station 20-1 sends sidelink configuration information to the WD 16-1, indicating a sidelink synchronization configuration (sidelink timing), and a sidelink resource configuration associated with the cell 22-2. The WD 16-1 uses the indicated configuration information to carry out a sidelink synchronization process, whereby it acquires sidelink synchronization with respect to the cell 22-2. Once synchronized with respect to sidelink communications via the sidelink synchronization process, the WD 16-1 resumes or begins sidelink communications using the sidelink resources and timing associated with the cell 22-2.

Advantageously, according to such operation, the WD 16-1 begins or resumes sidelink communications using the timing and resources associated with the cell 22-2 irrespective of whether the WD 16-1 has completed cellular handover processing with respect to the cell 22-2. For example, the WD 16-1 may be able to acquire sidelink synchronization more quickly than it can acquire cellular synchronization, which involves cell synchronization using cellular synchronization signals on the downlink and the acquisition of system information (SI) for connecting to the cell 22-2. More broadly, the WD 16-1 may perform sidelink communications using the sidelink timing and resource configuration of the cell 22-2 while still being served in the cellular sense by the cell 22-1, or at least before completing cellular handover to the cell 22-2.

Figure 2:
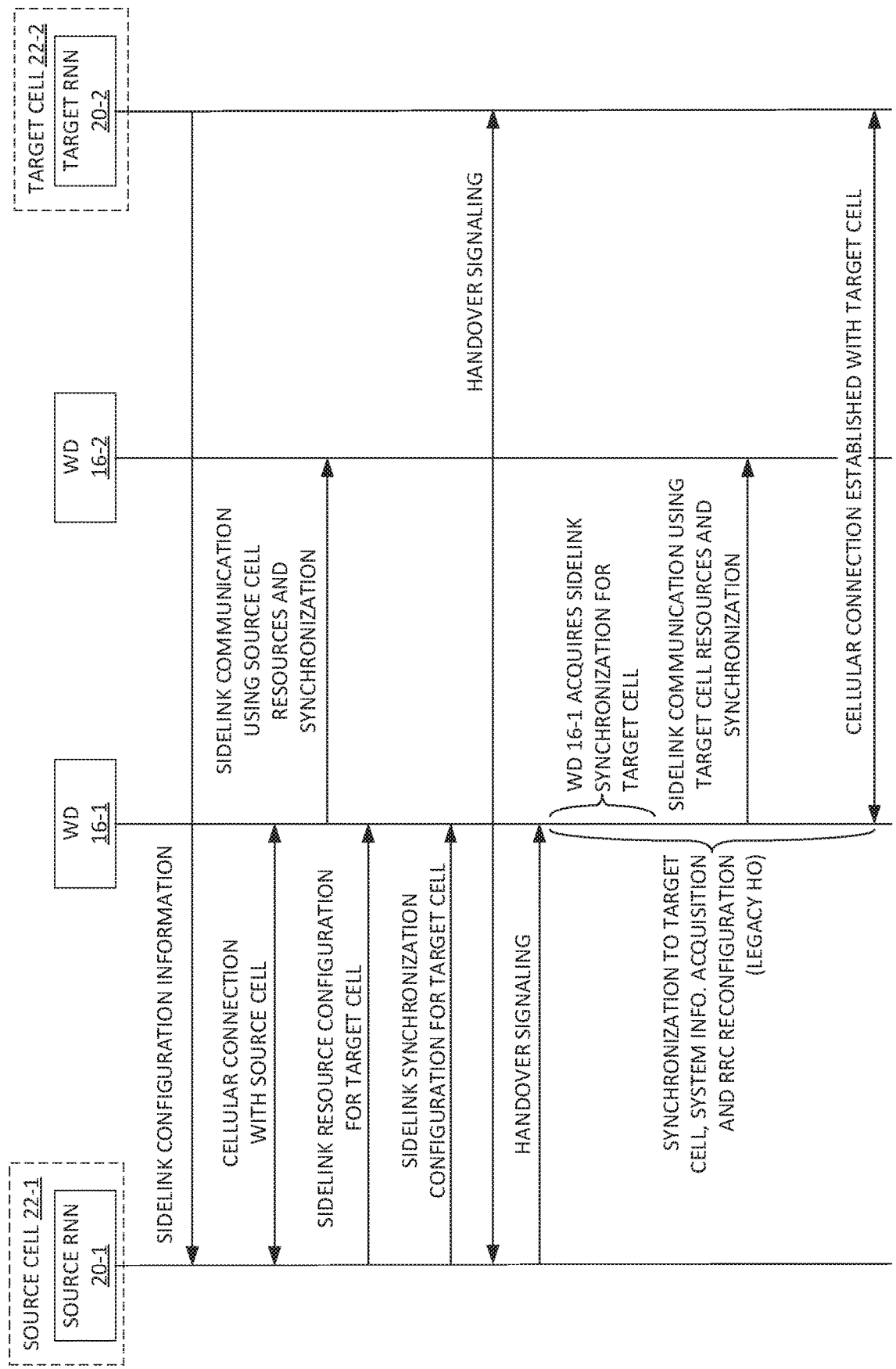
FIG. 2 is a signal flow diagram of one embodiment of signaling associated with a handover in a cellular network that involves sidelink communications.

FIG. 2 illustrates an example embodiment of such processing, involving a WD 16-1 engaged in sidelink communications with another WD 16-2. A target radio network node (RNN) 20-2 sends sidelink configuration information to a source RNN 20-1. The sidelink configuration information comprises, for example, sidelink resource configuration information indicating the configuration of resources allocated for sidelink communications in a target cell 22-2 associated with the target RNN 20-2. The sidelink configuration information may also include sidelink synchronization configuration information for the target cell 22-2, which information may indicate the time base or reference used for synchronizing sidelink communications to the target cell 22-2.

The source RNN 20-1 is associated with a source cell 22-1 and it may be assumed that the WD 16-1 is to be handed over from the source RNN 20-1/source cell 22-1 to the target RNN 20-2/target cell 22-2, and that such handover is undertaken while the WD 16-1 is engaged in sidelink communications with another WD 16-2. Before handover is performed, the sidelink communications use source-cell resources and timing synchronization, and it shall be understood that the source and target RNNs 20-1 and 20-2 may be, for example, eNBs associated with respective cells.

The WD 16-1 has a cellular connection to the RNN 20-1, e.g., as a "serving" node for the WD 16-1, and source RNN 20-1 may use that cellular connection to provide the WD 16-1 with sidelink configuration information for the target cell 22-2, e.g., by sending sidelink resource configuration information and sidelink synchronization configuration information to the WD 16-1. While FIG. 2 suggests the possibility of such information as being sent separately from the handover signaling, e.g., in advance of the handover signaling sent from the RNN 20-1 to the WD 16-1, it shall be understood that such signaling may be carried within the handover signaling. Broadly, the source RNN 20-1 sends sidelink configuration information for the target cell 22-2 in conjunction with handing the WD 16-1 over from the source cell 22-1 to the target cell 22-2, where such handover operations involve the source RNN 20-1 sending handover signaling to the target RNN 20-2, and to the WD 16-1.

The WD 16-1 acquires sidelink synchronization with the target cell 22-2 using the synchronization configuration information received from the source RNN 20-1 for the target RNN 20-2/target cell 22-2, and resumes sidelink communication with the other WD 16-2, using the target-cell resources and synchronization. In this example, such resumption occurs before completion of the cellular handover process, which involves the WD 16-1 synchronizing in a cellular sense to the target RNN 20-2, acquiring system information for the target RNN 20-2, and carrying out a Radio Resource Control (RRC) reconfiguration, for establishing a cellular connection to the target RNN 20-2.

Figure 3:
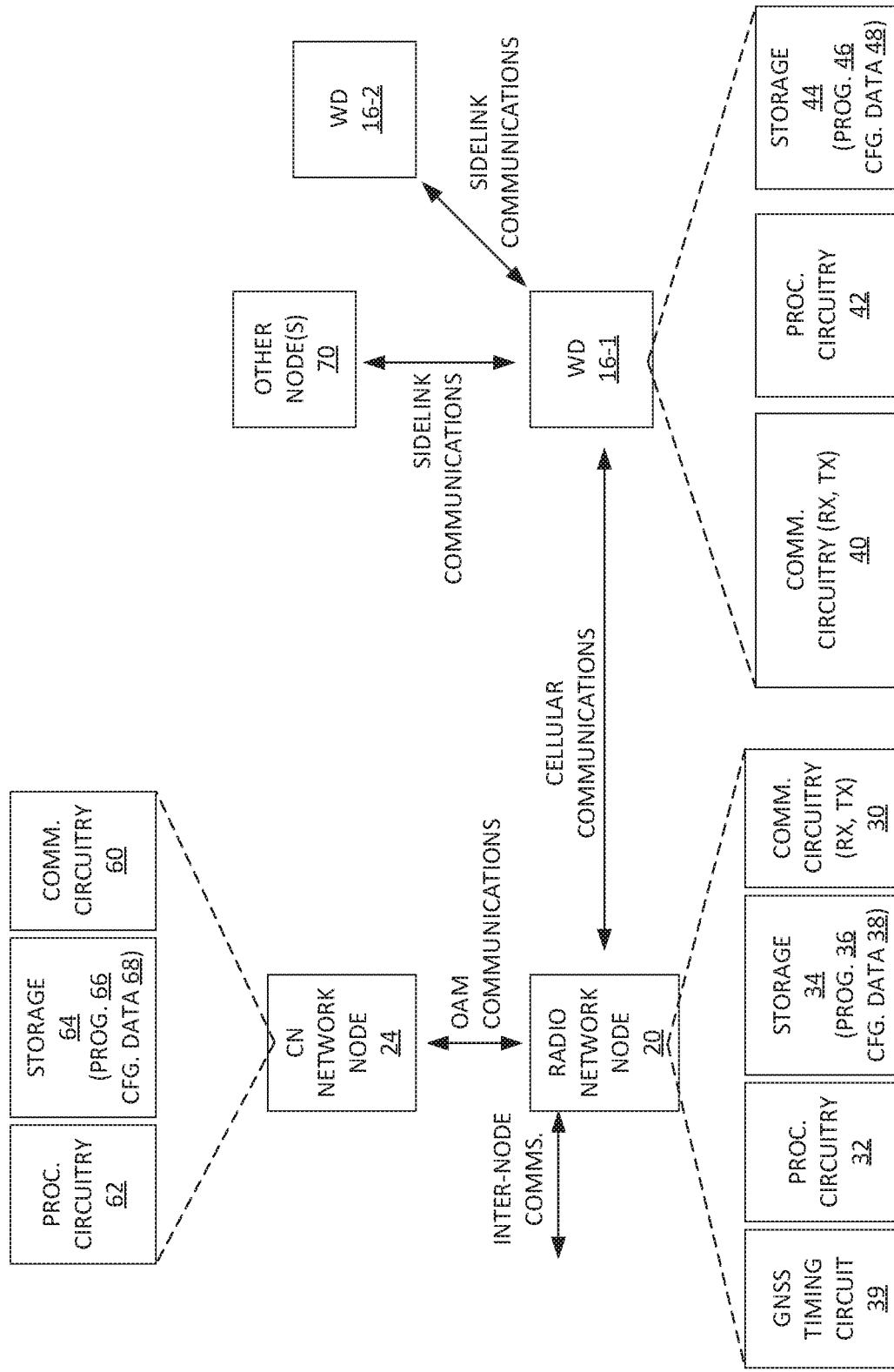
FIG. 3 is a block diagram of example embodiments of a several communication nodes, including a wireless device, a radio network node, and a core network node.

FIG. 3 illustrates example embodiments of a WD 16, a radio network node 20, and a Core Network (CN) node 24. In an LTE example, the radio network node 20 may be an eNB, and the CN node 24 may be a Mobility Management Entity (MME), an Operations and Maintenance (OAM) node, etc.

The radio network node 20 comprises a communication circuitry 30, processing circuitry 32, and storage 34. The communication circuitry 30 comprises communication interface circuits configured for communicating with one or more WDs 16, one or more CN nodes, and one or more other radio network nodes 20, and such circuitry may comprise separate interfaces. For example, the communication circuitry 30 includes one or more cellular radio circuits, such as a transceiver comprising a receiver circuit (RX) and a transmitter circuit (TX), along with associated transmit and receive processing circuitry, for communicating with WDs 16. Further, the communication circuitry 30 includes a network communication interface, e.g., an S1 interface, for communicating with the CN node 24.

The processing circuitry 32 comprises fixed circuitry, programmed circuitry, or a mix of fixed and programmed circuitry. In an example embodiment, the processing circuitry 32 comprises one or more microprocessor-based circuits or one or more DSP-based, FPGA-based, or ASIC-based circuits, or any mix thereof. In a particular example, the processing circuitry 32 is specially adapted or otherwise configured to operate according to the radio network node method(s) disclosed herein, via the execution of computer program instructions comprising a computer program 36. The processing circuitry 32 may further use and/or store various items of configuration data 38 associated with such operation, via the storage 34.

The storage 34 comprises any one or more of solid-state storage, disk storage, etc., and may provide both volatile, working memory and non-volatile, program and data storage. The storage 34, therefore, may include a mix of memory or storage circuits or device types. Non-limiting examples include any one or more of SRAM, DRAM, FLASH, EEPROM, and Solid State Disk (SSD) storage.

In any case, it shall be understood that in one or more embodiments the storage 34 includes a non-transitory computer-readable medium storing a computer program 36, the execution of which by the processing circuitry in the radio network node 20 configures the processing circuitry 32 according to the teachings herein. Non-transitory, as used here, does not necessarily mean permanent or unchanging, but does denote storage of at least some persistence.

The radio network node 20 also may include a Global Navigation Satellite System (GNSS) timing circuit 39, e.g., for synchronizing sidelink communications with respect to its resources, based on GNSS timing. Alternatively, the radio network node 20 may receive GNSS timing from another node in the network 10.

Similarly, the WD 16 comprises communication circuitry 40, processing circuitry 42, and storage 44. The communication circuitry 40 comprises, for example, one or more cellular radio circuits, such as a transceiver comprising a receiver circuit (RX) and a transmitter circuit (TX), along with associated transmit and receive processing circuitry. The communication circuitry 40 may also include other types of communication interface circuitry, e.g., for near-field communications, Wi-Fi, Bluetooth, etc.

The processing circuitry 42 comprises fixed circuitry, programmed circuitry, or a mix of fixed and programmed circuitry. In an example embodiment, the processing circuitry 42 comprises one or more microprocessor-based circuits or one or more DSP-based, FPGA-based, or ASIC-based circuits, or any mix thereof.

In a particular example, the processing circuit 42 is specially adapted or otherwise configured to carry out the device-side signaling and operations disclosed herein, via the execution of computer program instructions comprising a computer program 46. The processing circuitry 42 may further use and or store various items of configuration data 48 associated with such operation, via the storage 44.

The storage 44 comprises any one or more of solid-state storage, disk storage, etc., and may provide both volatile, working memory and non-volatile, program and data storage. Thus, the storage 44 may include a mix of memory or storage circuits or device types. Non-limiting examples include any one or more of SRAM, DRAM, FLASH, EEPROM, and Solid State Disk (SSD) storage. It shall be understood that in one or more embodiments the storage 44 includes a non-transitory computer-readable medium storing a computer program 46, the execution of which by processing circuitry 42 in the WD 16 configures the processing circuitry 42 according to the teachings herein.

The CN node 24 comprises communication circuitry 60, processing circuitry 62, and storage 64. The communication circuitry 60 comprises communication interface circuits configured for communicating with one or more radio network nodes 24, and, possibly, with one or more other CN nodes of like or differing types. The communication circuitry 60, therefore, may comprise separate interfaces, e.g., an S1 interface, for communicating with the radio network node 20, and one or more other types of interfaces for communication with other types of nodes.

The processing circuitry 62 comprises fixed circuitry, programmed circuitry, or a mix of fixed and programmed circuitry. In an example embodiment, the processing circuitry 62 comprises one or more microprocessor-based circuits or one or more DSP-based, FPGA-based, or ASIC-based circuits, or any mix thereof. In a particular example, the processing circuitry 62 is specially adapted or otherwise configured to operate according to the CN node method(s) disclosed herein, via the execution of computer program instructions comprising a computer program 66. The processing circuitry 62 may further use and or store various items of configuration data 68 associated with such operation, via the storage 64.

The storage 64 comprises any one or more of solid-state storage, disk storage, etc., and may provide both volatile, working memory and non-volatile, program and data storage, and thus may include a mix of memory or storage circuit or device types. Non-limiting examples include any one or more of SRAM, DRAM, FLASH, EEPROM, and Solid State Disk (SSD) storage.

In one or more embodiments the storage 64 includes a non-transitory computer-readable medium storing a computer program 66, the execution of which by processing circuitry 62 in the CN node 24 configures the processing circuitry 62 according to the teachings herein. Non-transitory, as used here, does not necessarily mean permanent or unchanging, but does denote storage of at least some persistence.

Figure 4:
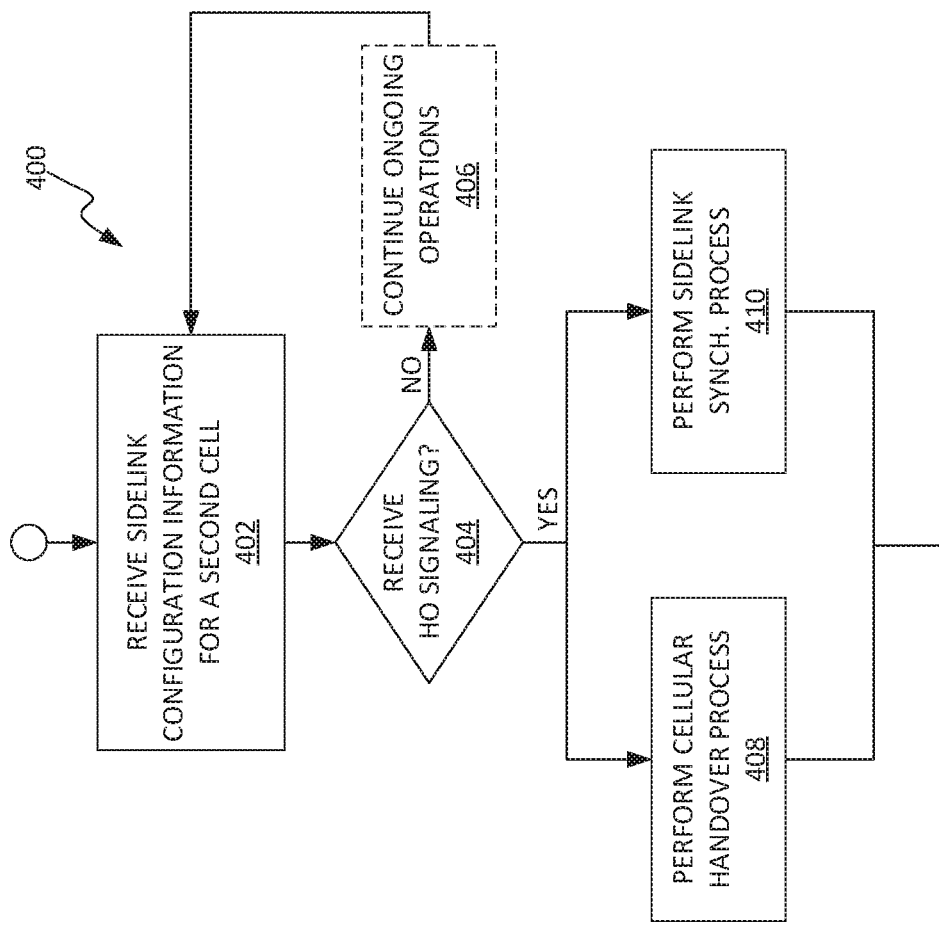
FIG. 4 is a logic flow diagram of one embodiment of a method of processing at a wireless device, for a cellular handover of the wireless device involving sidelink communications.

FIG. 4 illustrates one embodiment of a method 400 of operation in a WD 16 configured for operation in a wireless communication network 10. The method 400 includes receiving (Block 402) sidelink configuration information for a second cell 22-2 of the wireless communication network 10, indicating sidelink resources and sidelink timing associated with the second cell 22-2. Further, the method includes receiving (Block 404) handover signaling indicating a cellular handover of the wireless device 16 from a first cell 22-1 of the wireless communication network 10 to the second cell 22-2, and, in response: performing (Block 408) a cellular handover process with respect to the second cell 22-2, including acquiring cellular synchronization with respect to the second cell 22-2; and performing (Block 410) a sidelink synchronization process with respect to the second cell 22-2, including acquiring sidelink timing synchronization with respect to the second cell 22-2, and resuming or initiating sidelink communications using the sidelink resources and the sidelink timing associated with the second cell 22-2, once sidelink synchronization is acquired with respect to the second cell 22-2 via the sidelink synchronization process and irrespective of whether the cellular handover process has been completed. Note that if handover signaling is not received (NO from Block 404), the WD 16 continues with ongoing operations (Block 406). Here, the first and second cells 22-1 and 22-2 may be "source" and "target" cells, as were discussed in the context of FIG. 2.

In the handover context, resuming sidelink communications using the sidelink resources and the sidelink timing associated with the second cell 22-2 comprises resuming sidelink communications that were previously performed according to the sidelink resources and sidelink timing associated with the first cell 22-1. In an example embodiment or scenario, the sidelink timing in the second cell 22-2 uses a sidelink timing reference that is different than a downlink timing reference used for cellular synchronization in the second cell 22-2. In such cases, the sidelink synchronization process uses the sidelink timing reference and the cellular synchronization process uses the downlink timing reference.

In at least one case or embodiment, the sidelink timing reference in the second cell 22-2 comprises a GNSS timing reference, and the downlink timing reference comprises one or more downlink synchronization signals transmitted in the second cell 22-2, such as Primary Synchronization Signals (PSS) and Secondary Synchronization Signals (SSS). The WD 16 thus synchronizes with respect to the GNSS timing reference for sidelink communications conducted using sidelink resources associated with the second cell 22-2, and synchronizes with respect to the downlink synchronization signals for cellular communications conducted with respect to the second cell 22-2.

In yet another embodiment or example case, receiving (Block 402) the sidelink configuration information for the second cell 22-2 comprises receiving the sidelink configuration information for the second cell 22-2 via a cellular connection with the first cell 22-1. For example, the radio network node 20 associated with the first cell 22-1 provides the sidelink configuration information for the second cell 22-2 in advance of, or in conjunction with, handover of the WD 16 to the second cell 22-2.

In a complementary example embodiment, a WD 16 is configured to carry out the method 400, or variations and extensions thereof. With momentary reference back to FIG. 3, an example WD 16 includes communication circuitry 40 and processing circuitry 42. The communication circuitry 40 is configured for communicating with radio network nodes 20 in the wireless communication network 10 via cellular connections and for communicating with other WDs 16 or nodes 70 via sidelink connections. Further, the processing circuitry 42 is operatively associated with the communication circuitry 40 and is configured to: receive sidelink configuration information for a second cell 22-2 of the wireless communication network 10, indicating sidelink resources and sidelink timing associated with the second cell 22-2; receive handover signaling indicating a cellular handover of the wireless device 16 from a first cell 22-1 of the wireless communication network 10 to the second cell 22-2. The processing circuitry 42 is configured to respond to the handover signaling by performing a cellular handover process with respect to the second cell 22-2, including acquiring cellular synchronization with respect to the second cell 22-2, and performing a sidelink synchronization process with respect to the second cell 22-2. The sidelink synchronization process includes acquiring sidelink timing synchronization with respect to the second cell 22-2. The WD 16 resumes or initiates sidelink communications using the sidelink resources and the sidelink timing associated with the second cell 22-2, once sidelink synchronization is acquired with respect to the second cell 22-2 via the sidelink synchronization process and irrespective of whether the cellular handover process has been completed.

Figure 5:
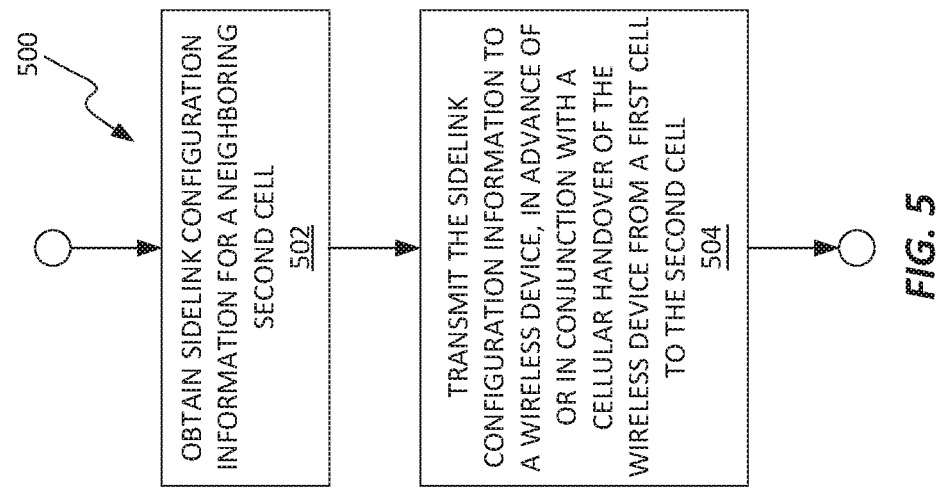
FIG. 5 is a logic flow diagram of one embodiment of a method of processing at a radio network node, for cellular handover of a wireless device involving sidelink communications.

As for complementary, network-side operations, FIG. 5 illustrates one embodiment of a method 500 of operation at a radio network node 20 configured for operation in a wireless communication network 10. The method 500 includes determining (Block 502) sidelink configuration information for a second cell 22-2 that neighbors a first cell 22-1 provided by the radio network node 20. The sidelink configuration information indicates a sidelink resource configuration for the second cell 22-2, and a sidelink synchronization configuration for the second cell 22-2. In an example embodiment, the radio network node 20 obtains the sidelink configuration information based on receiving it from another radio network node 20, e.g., one that is associated with the second cell 22-2. In another alternative, the radio network node 20 receives the sidelink configuration information from a node in the CN 14.

In any case, the method 500 further includes the radio network node 20 transmitting (Block 504) the sidelink configuration information to a WD 16 having a cellular connection to the first cell 22-1. The transmission of sidelink configuration information to the WD 16 occurs in advance of, or in conjunction with, a cellular handover of the WD 16 from the first cell 22-1 to the second cell 22-2. The sidelink configuration information enables the WD 16 to acquire sidelink timing synchronization with respect to the second cell 22-2 using the indicated sidelink synchronization configuration.

Transmitting (Block 504) the sidelink configuration information to the WD 16 comprises, for example, transmitting an indication that the second cell 22-2 uses a sidelink timing reference that is different than a downlink timing reference used by the second cell 22-2. In the same example case or embodiment, or in another example case or embodiment, transmitting (Block 504) the sidelink configuration information to the WD 16 comprises the radio network node 20 transmitting an indication that the second cell 22-2 uses a GNSS timing reference for sidelink timing. Such embodiments represent efficient mechanisms for providing the WD 16 with enough information to obtain sidelink synchronization with respect to the second cell 22-2, while offering the advantages of low signaling overhead.

In any case, the sidelink configuration information can be sent from the radio network node 20 to the WD 16 using, for example, RRC signaling. The information can be sent in advance of handover signaling sent by the radio network node 20 to the WD 16, or it can be sent in conjunction with such handover signaling. In at least one embodiment, the handover signaling includes the sidelink configuration information. Further, in one or more embodiments, the radio network node 20 decides to transmit the sidelink configuration information to the WD 16 responsive to at least one of: a decision to initiate the cellular handover of the WD 16, and a determination that the WD 16 is likely to be handed over. As an example of determining that the WD 16 is likely to be handed over, the radio network node 20 determines that the WD 16 is likely to be handed over as a function of any one or more of: a current location of the WD 16, a direction of movement of the WD 16, and reception conditions at the WD 16 with respect to one or more cells 22.

In a complementary example embodiment, a radio network node 20 is configured to carry out the method 500, or variations and extensions thereof. With momentary reference back to FIG. 3, an example radio network node 20 is configured for operation in a wireless communication network 10 and comprises communication circuitry 30 and processing circuitry 32. The communication circuitry 30 comprises receiver and transmitter circuitry configured for communicating with wireless devices and the processing circuitry 32 is operatively associated with the communication circuitry 30.

More particularly, the processing circuitry 32 is configured to: obtain sidelink configuration information for a second cell 22-2 of the wireless communication network 10 that neighbors a first cell 22-1 provided by the radio network node 20. The sidelink configuration information indicates a sidelink resource configuration for the second cell 22-2, and a sidelink synchronization configuration for the second cell 22-2. The processing circuitry 32 is further configured to transmit the sidelink configuration information to a WD 16 having a cellular connection to the first cell 22-1. The transmission of the sidelink configuration information occurs, in advance of, or in conjunction with, a cellular handover of the WD 16 from the first cell 22-1 to the second cell 22-2. Such information enables the WD 16 to acquire sidelink timing synchronization with respect to the second cell 22-2.

In one example, the processing circuitry 32 determines the sidelink configuration information for the second cell 22-2, based on receiving such information, or related information, from another radio network node 20, e.g., via inter-node communication interface signaling. Alternatively, the radio network node 20 receives such information from an OAM node, or other node in the CN 14. Further, in one example, the radio network node 20 sends the sidelink synchronization configuration information in the form of a flag, information element, or other data item that indicates the timing reference or base to be used by the WD 16 for sidelink synchronization in the second cell 22-2. For example, the radio network node 20 sends an indication that the second cell 22-2 uses GNSS-based timing for sidelink communications.

While some examples herein involve V2X/ITS traffic using cellular network resources, it will be appreciated that the teachings herein may be applied to any traffic with similar characteristics. Further, to appreciate advantages attending the teachings herein, consider that a "legacy" or conventional cellular handover includes the following steps: (1) as part of the HO reconfiguration command message the source radio network node 20, e.g., an eNB, may signal a device-specific resource configuration to be used in the target cell; (2) the WD 16, e.g., a UE, initiates the HO procedure and stops sidelink operation; (3) the UE obtains synchronization for the target cell and reads system information; and (4) the UE resumes sidelink operation in the target cell. Thus, conventionally, there is a certain, potentially significant, service interruption while the UE acquires synchronization and system information for the target cell.

The teachings herein can be understood as "decoupling" the resumption of sidelink communications from cellular handover process, and involves providing signaling to an appropriately configured UE. The signaling indicates sidelink timing and resources for a target cell, and enables the UE to synchronize to the target cell with respect to sidelink communications and begin or resume sidelink communications using target-cell resources, irrespective of whether the cellular handover of the UE to the target cell has completed.

The signaling to the UE includes, for example, the configuration of sidelink resources to be used in the target cell. Common sidelink resources that are not specific for a certain UE may be indicated in such signaling. The signaling further includes synchronization configuration to be used in the target cell. For example, different cells (eNBs) may configure devices to prioritize different synchronization sources differently. In one example an eNB configures UEs in its coverage to follow a certain UTC timing, derived e.g. from GNSS signals. In another example an eNB configures UEs in its coverage to follow cellular timing, derived e.g. from downlink signals.

The above information needs to be exchanged among eNBs and potentially other NW nodes prior to the HO. Any protocol using any interface (e.g., X2) may be used for such a purpose, including e.g. OAM or other proprietary procedures in the radio network.

With respect to X2AP, an optional IE with assigned criticality "ignore" can be added to the LOAD INFORMATION message to convey the above information for one or more cells served by the sending eNB. The same could also be achieved by using a private message instead of a standardized X2AP message.

It is worth noting, however, that synchronization configuration for a cluster of eNBs is not likely to change frequently in time, so the benefit of exchanging this type of information over a network interface may not be clear: coordination over OAM offers advantageous operation in this respect.

A further aspect of the teachings herein, at least in some embodiments, is a new UE procedure for performing sidelink communication. Here, "sidelink communications" refers to any combination of transmission and/or reception. In particular, after having received the RRC sidelink reconfiguration described in the signaling above, the UE will: (1) acquire the synchronization reference according to the protocol/priority/configuration indicated by the HO command message sent by source cell to UE and containing target cell information; and (2) initiate sidelink operation using the sidelink resources configuration for the target cell, while still being served by the source cell. Sidelink resource configuration can include either a pool of resources to be autonomously selected by the UE or an eNB-selected resource allocation.

Sidelink resources of the target cell can be used only for the duration of the handover, i.e. until triggering RRCConnectionReconfigurationComplete or in case Radio Link Failure (RLF) is declared while performing handover. Alternatively, sidelink resources can be used further notification from target eNB (i.e. new resource configuration provided either via dedicated signaling or dynamic grants on PDCCH), or in case RLF is declared. Such UE operations may be required by standards implementation, or may be left for implementation as a proprietary feature.

One or more of the embodiments disclosed herein can be used by both idle-mode and connected-mode UEs, for cell selection/reselection. Sidelink resources to be used in the target cell can also be acquired via broadcast signaling (e.g. System Information Block or SIB broadcasting) from the source cell. Of course, not all embodiments may use such signaling. In embodiments that do, however, the SIB signaling of the source cell carries resource configuration to be used by the UE, at least until completion of cell selection/reselection procedure (for UEs in idle mode) or handover (for UEs in connected mode) or RLF (for UEs in connected mode).

Such SIB signaling can carry along with the resource configuration also the cell ID of the cell for which that resource configuration applies. The cell ID is supposed to be already known by the UE (e.g. from PSS/SSS acquisition). When the UE performs cell selection/reselection or handover towards a target cell the corresponding resource configuration is used. Acquisition of resource configuration via SIB can be done by the UE before handover triggering (e.g. after measurement report triggering) or before performing cell selection/reselection.

In another embodiment, UE uses pre-configured resources when doing handover or when doing cell selection/reselection. Usage of pre-configured resources is triggered by the handover command or by initiation of cell selection/reselection procedure.

With the above in mind, it will be appreciated that, similar to considerations associated with the Uu interface (the cellular link) between a UE and the cellular network, UEs engaged in PC5 communications are subject to latency when performing the handover. Looking at ProSe according to a conventional approach, a UE before continuing an ongoing PC5 session after handover command needs to wait for the target cell sending a D2D grant on PDCCH or dedicated signaling (if in connected mode) indicating mode 1 and mode 2 resource allocation respectively. This disclosure presents various example methods and apparatuses for eliminating or at least substantially reducing PC5 service interruptions associated with cellular handover of UEs involved in PC5 communications.

For UEs in connected mode, target cell PC5 resources as well as information about synchronization configuration in the target cell can be transferred via the (cellular) handover command. For example, if the target cell uses GNSS-based synchronization for sidelink, the UE may continue PC5 operations virtually without any interruption during the handover operation. Thus, one solution presented herein involves the signaling of the PC5 resources of the target cell, as well as the PC5 synchronization configuration of the target cell, to the UE via the handover command.

Such information also may be sent in advance of the handover command, e.g., responsive to determining that the handover decision has been made or initiated, or responsive to determining that handover is likely. In any case, the UE uses the signaled information to avoid or minimize interruption of sidelink operation during HO. At least in cases where the source and target cell use the same GNSS synchronization reference, signaling an indication of such to the UE may allow the UE to avoid interruptions in sidelink communications in association with being handed over from the source cell to the target cell. In other words, one example of signaling sidelink synchronization configuration information for a target cell to a UE comprises sending an indication to the UE that the target cell uses the same timing reference or base for sidelink communications as is used in the source cell. More broadly, transmitting the sidelink synchronization configuration information to the UE for the target cell may comprise sending a flag, information element, or other indicator, indicating the timing reference for synchronization of sidelink communications when using resources in the target cell.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

ABBREVIATIONS

3G Third Generation of Mobile Telecommunications Technology
BSM Basic Safety Message
BW Bandwidth
CAM Cooperative Awareness Message
DPTF Data Packet Transmission Format
D2D Device-to-Device Communication
DENM Decentralized Environmental Notification Message
DSRC Dedicated Short-Range Communications
eNB eNodeB
ETSI European Telecommunications Standards Institute
LTE Long-Term Evolution
NW Network
RS Reference Signals
TF Transport Format
SAE Society of the Automotive Engineers
UE User Equipment
V2I Vehicle-to-Infrastructure
V2P Vehicle-to-Pedestrian
V2V Vehicle-to-vehicle communication
V2x Vehicle-to-anything-you-can-imagine
wrt with respect to
SPS Semi Persistent Scheduling
DMRS Demodulation reference signals
OCC Orthogonal cover code
HO Handover
SIB System Information Block
RLF Radio Link Failure
3GPP Third Generation Partnership Project
RRC Radio Resource Control
PDCCH Physical Downlink Control Channel
PSS Primary Synchronization Signal
SSS Secondary Synchronization Signal

What is claimed is:

1. A method of operation in a wireless device configured for operation in a wireless communication network, the method comprising:
receiving sidelink configuration information for a second cell of the wireless communication network, indicating sidelink resources and sidelink timing associated with the second cell;
receiving handover signaling indicating a cellular handover of the wireless device from a first cell of the wireless communication network to the second cell, and, in response:

performing a cellular handover process with respect to the second cell, including acquiring cellular synchronization with respect to the second cell; and performing a sidelink synchronization process with respect to the second cell, including acquiring sidelink timing synchronization with respect to the second cell, and resuming or initiating sidelink communications using the sidelink resources and the sidelink timing associated with the second cell, once sidelink synchronization is acquired with respect to the second cell via the sidelink synchronization process and irrespective of whether the cellular handover process has been completed; and wherein the sidelink timing associated with the second cell uses a sidelink timing reference that is different than a downlink timing reference used for the cellular synchronization with respect to the second cell, and wherein the sidelink synchronization process uses the sidelink timing reference and the cellular synchronization process uses the downlink timing reference.

2. The method of claim 1, wherein resuming or initiating the sidelink communications using the sidelink resources and the sidelink timing associated with the second cell comprises resuming sidelink communications previously performed according to sidelink resources and sidelink timing associated with the first cell.

3. The method of claim 1, wherein the sidelink timing reference comprises a Global Navigation Satellite System (GNSS) timing reference, and wherein the downlink timing reference comprises one or more downlink synchronization signals transmitted in the second cell.

4. The method of claim 1, wherein the receiving the sidelink configuration information for the second cell comprises receiving the sidelink configuration information for the second cell via a cellular connection with the first cell.

5. A wireless device configured for operation in a wireless communication network, the wireless device comprising:

communication circuitry configured for communicating with radio network nodes in the wireless communication network via cellular connections and for communicating with other wireless devices or nodes via sidelink connections; and processing circuitry operatively associated with the communication circuitry and configured to:

receive sidelink configuration information for a second cell of the wireless communication network, indicating sidelink resources and sidelink timing associated with the second cell;

receive handover signaling indicating a cellular handover of the wireless device from a first cell of the wireless communication network to the second cell, and, in response:

perform a cellular handover process with respect to the second cell, including acquiring cellular synchronization with respect to the second cell; and perform a sidelink synchronization process with respect to the second cell, including acquiring sidelink timing synchronization with respect to the second cell, and resume or initiate sidelink communications using the sidelink resources and the sidelink timing associated with the second cell, once sidelink synchronization is acquired with respect to the second cell via the sidelink synchronization process and irrespective of whether the cellular handover process has been completed; and wherein the sidelink timing associated with the second cell uses a sidelink timing reference that is different than a downlink timing reference used for the cellular synchronization with respect to the second cell, and wherein the processing circuitry is configured to perform the sidelink synchronization process using the sidelink timing reference, and perform the cellular synchronization process using the downlink timing reference.

6. The wireless device of claim 5, wherein the processing circuitry is configured to perform the sidelink communications according to sidelink timing and sidelink resources associated with the first cell in advance of receiving the handover signaling, and to resume the sidelink communications according to the sidelink timing and sidelink resources associated with the second cell.

7. The wireless device of claim 5, wherein the sidelink timing reference comprises a Global Navigation Satellite System (GNSS) timing reference, and wherein the downlink timing reference comprises one or more downlink synchronization signals transmitted in the second cell.

8. The wireless device of claim 5, wherein the processing circuitry is configured to receive the sidelink configuration information for the second cell via a cellular connection of the wireless device with the first cell.

9. A non-transitory computer readable medium storing a computer program comprising instructions that, when executed by at least one processor of a wireless device configured for operation in a wireless communication network, causes the wireless device to:

receive sidelink configuration information for a second cell of the wireless communication network, indicating sidelink resources and sidelink timing associated with the second cell;

receive handover signaling indicating a cellular handover of the wireless device from a first cell of the wireless communication network to the second cell, and, in response:

perform a cellular handover process with respect to the second cell, including acquiring cellular synchronization with respect to the second cell; and perform a sidelink synchronization process with respect to the second cell, including acquiring sidelink timing synchronization with respect to the second cell, and resume or initiate sidelink communications using the sidelink resources and the sidelink timing associated with the second cell, once sidelink synchronization is acquired with respect to the second cell via the sidelink synchronization process and irrespective of whether the cellular handover process has been completed; and wherein the sidelink timing associated with the second cell uses a sidelink timing reference that is different than a downlink timing reference used for the cellular synchronization with respect to the second cell, and wherein the processing circuitry is configured to perform the sidelink synchronization process using the sidelink timing reference, and perform the cellular synchronization process using the downlink timing reference.

* * * * *

UNITED STATES PATENT AND TRADEMARK OFFICE
CERTIFICATE OF CORRECTION

PATENT NO. : 10,575,224 B2
APPLICATION NO. : 15/512424
DATED : February 25, 2020
INVENTOR(S) : Belleschi et al.

It is certified that error appears in the above-identified patent and that said Letters Patent is hereby corrected as shown below:

In the Specification

In Column 2, Line 44, delete "(DCIS)" and insert -- (DCI5) --, therefor.

In Column 4, Line 3, delete "cellular synchronization process" and insert -- cellular synchronization --, therefor.

In Column 5, Line 29, delete "RAN 10" and insert -- RAN 12 --, therefor.

In Column 5, Line 33, delete "network node 20-1" and insert -- network node 20 --, therefor.

In Column 8, Line 14, delete "and or" and insert -- and/or --, therefor.

In Column 8, Line 32, delete "network node 24," and insert -- network node 20, --, therefor.

In Column 8, Line 48, delete "and or" and insert -- and/or --, therefor.

In Column 9, Line 37, delete "synchronization process uses" and insert -- synchronization uses --, therefor.

In the Claims

In Column 15, Line 19, in Claim 1, delete "synchronization process uses" and insert -- synchronization uses --, therefor.

In Column 16, Line 11, in Claim 5, delete "synchronization process using" and insert -- synchronization using --, therefor.

In Column 16, Line 61, in Claim 9, delete "synchronization process using" and insert -- synchronization using --, therefor.

Signed and Sealed this
Sixteenth Day of June, 2020

Andrei Iancu
*Director of the United States Patent and Trademark Office*